(12) United States Patent
Matsumoto

(10) Patent No.: US 12,559,904 B2
(45) Date of Patent: Feb. 24, 2026

(54) WORKING VEHICLE

(71) Applicant: TAKEUCHI MFG. CO., LTD., Hanishina-gun (JP)

(72) Inventor: Tetsuya Matsumoto, Hanishina-gun (JP)

(73) Assignee: TAKEUCHI MFG. CO., LTD., Hanishina-gun (JP)

( * ) Notice: Subject to any disclaimer, the term of this patent is extended or adjusted under 35 U.S.C. 154(b) by 284 days.

(21) Appl. No.: 18/223,096

(22) Filed: Jul. 18, 2023

(65) Prior Publication Data

US 2024/0287757 A1 Aug. 29, 2024

(30) Foreign Application Priority Data

Feb. 27, 2023 (JP) ................................. 2023-027876

(51) Int. Cl.
| | |
|---|---|
| *E02F 9/08* | (2006.01) |
| *B60L 53/16* | (2019.01) |
| *E02F 9/20* | (2006.01) |

(52) U.S. Cl.
CPC ............ *E02F 9/0866* (2013.01); *E02F 9/207* (2013.01); *B60L 53/16* (2019.02); *B60L 2200/40* (2013.01)

(58) Field of Classification Search
CPC ......... E02F 9/0866; E02F 9/207; B60L 53/16; B60L 2200/40
USPC ....................................................... 180/65.1
See application file for complete search history.

(56) References Cited

U.S. PATENT DOCUMENTS

| | | | |
|---|---|---|---|
| 8,344,692 B2 * | 1/2013 | Sakurai ................... | B60L 53/16 |
| | | | 320/109 |
| 9,160,184 B2 | 10/2015 | Ang | |
| 9,975,444 B2 * | 5/2018 | Sarkar ...................... | B60L 3/04 |
| 11,322,311 B2 * | 5/2022 | Macaluso ................. | H02J 7/32 |

(Continued)

FOREIGN PATENT DOCUMENTS

| | | |
|---|---|---|
| CN | 111969358 A | 11/2020 |
| DE | 102011118957 A1 | 5/2013 |

(Continued)

OTHER PUBLICATIONS

Extended (Supplementary) European Search Report dated Jul. 8, 2024, issued in counterpart EP Application No. 23186367.1. (15 pages).

(Continued)

*Primary Examiner* — Hau V Phan
(74) *Attorney, Agent, or Firm* — WHDA, LLP

(57) ABSTRACT

A working vehicle includes a relay component and three chargers for a single-phase alternating-current power supply to supply electric power to an electric motor. Selected as the relay component and mounted to the vehicle body is a first relay component when the external power supply PS is a three-phase alternating-current power supply and the power cable Ca has an output plug PgA of a four-wire type including a ground wire, a second relay component when the external power supply PS is the three-phase alternating-current power supply and the power cable Ca has an output plug PgB of a five-wire type including the ground wire, or a third relay component when the external power supply PS is a single-phase alternating-current power supply and the power cable Ca has an output plug PgC of a three-wire type including the ground wire.

7 Claims, 6 Drawing Sheets

(56)     References Cited

U.S. PATENT DOCUMENTS

| | | | |
|---|---|---|---|
| 11,440,424 B2 * | 9/2022 | Yu ..................... | H01M 10/448 |
| 2008/0283324 A1 * | 11/2008 | Iwaki .................. | B60K 17/356 |
| | | | 180/242 |
| 2010/0096921 A1 * | 4/2010 | Ishida .................... | B60L 50/53 |
| | | | 307/82 |
| 2013/0345932 A1 * | 12/2013 | Iwanaga ............ | H02J 7/00034 |
| | | | 320/108 |
| 2015/0231974 A1 * | 8/2015 | Yunoue .................. | E02F 3/325 |
| | | | 307/10.1 |
| 2022/0209564 A1 | 6/2022 | Hashimoto et al. | |
| 2022/0355678 A1 | 11/2022 | Seo | |

FOREIGN PATENT DOCUMENTS

| | | | |
|---|---|---|---|
| JP | 2011-113682 A | 6/2011 | |
| JP | 2012-001889 A | 1/2012 | |
| JP | 2017-212132 A | 11/2017 | |
| JP | 6463537 B1 | 2/2019 | |
| JP | 2020-167811 A | 10/2020 | |

OTHER PUBLICATIONS

Office Action dated Jun. 17, 2025, issued in counterpart JP Application No. 2023-027876, with English translation (8 pages).
Office Action dated Sep. 2, 2025, issued in counterpart JP application No. 2023-027876, with English translation. (6 pages).

* cited by examiner

FRONT — UP — RIGHT
LEFT — REAR
DOWN 62 (62A)

62 (62B)

62 (62C)

UP

FRONT    RIGHT

LEFT    REAR

DOWN

WORKING VEHICLE

CROSS-REFERENCE TO RELATED APPLICATION

This application is based upon and claims the benefit of priority of the prior Japanese Patent Application No. P2023-027876, filed on Feb. 27, 2023, and the entire contents of which are incorporated herein by reference.

TECHNICAL FIELD

The present invention relates to a working vehicle including a working unit working by a hydraulic pressure and an electric motor that is a drive source for the working unit.

BACKGROUND ART

As an example of a working vehicle, a hydraulic excavator, a track loader, and the like each configured with a lower body to which running crawlers or wheels are mounted, an upper body provided on the lower body, and a working unit mounted to the lower body or the upper body and that works by a hydraulic pressure are known.

Recently, a working vehicle driven by an electric motor instead of a conventional engine is under development (refer to PTL: Japanese Patent No. 6463537).

SUMMARY OF INVENTION

Technical Problem

For the working vehicle driven by the electric motor described by way of example, an approach of connecting an external power cable to an in-vehicle charger mounted in a vehicle body to supply electric power from an external power supply is widely adopted.

SUMMARY OF INVENTION

Here, the external power supply and the power cable used by a user of the working vehicle driven by the electric motor have a plurality of specifications. Specifically, there are at least three specifications for the following cases including (1) a case where the external power supply is a three-phase alternating-current power supply and the power cable has an output plug of a four-wire type including a ground wire, (2) a case where the external power supply is a three-phase alternating-current power supply and the power cable has an output plug of a five-wire type including a ground wire, and (3) a case where the external power supply is a single-phase alternating-current power supply and the power cable has an output plug of a three-wire type including a ground wire (While the three-phase alternating-current power supply may have different voltages such as 200 V and 400V and the single-phase alternating-current power supply may have different voltages such as 100 V and 200 V, these differences can be handled by changing withstand voltage performances of interconnections and devices. Therefore, it is enough to consider basic configurations corresponding to the three types (1) to (3).)

When different external power supplies, i.e., the three-phase alternating-current power supply and the single-phase alternating-current power supply are necessary, it may be proposed to take measures of mounting a dedicated in-vehicle charger, i.e., either a charger for the three-phase alternating-current power supply or a charger for the single-phase alternating-current power supply in the working vehicle. In that case, electric power cannot be supplied to the working vehicle in which the charger for the single-phase alternating-current power supply is mounted as the in-vehicle charger from the external power supply that is the three-phase alternating-current power supply. Likewise, electric power cannot be supplied to the working vehicle in which the charger for the three-phase alternating-current power supply is mounted as the in-vehicle charger from the external power supply that is the single-phase alternating-current power supply. Furthermore, when the power supplies are identical in specifications but differ in the number of pins of the power cable, it is still impossible to supply electric power.

Alternatively, to deal with differences of the power supply, it may be considered to mount a transformer, a phase converter, or the like that converts the power in the working vehicle. However, that may entail problems including a complicated vehicle structure, a vehicle cost increase, an increase in assembly man-hours.

Solution to Problem

The present invention has been accomplished under the solution as described below. An object of the present invention is to provide a working vehicle capable of supplying electric power using two types of external power supplies including at least a three-phase alternating-current power supply and three types of power cables by being configured to mount only a charger for a single-phase alternating-current power supply as an in-vehicle charger without mounting a device converting the three-phase alternating-current power supply into a single-phase alternating-current power supply.

The present invention solves the problems by the following solutions.

A working vehicle according to one aspect of the present invention is a working vehicle including: a vehicle body; a travel unit; a working unit working by a hydraulic pressure; and an electric motor serving as a drive source for the travel unit or the working unit, the working vehicle including: an in-vehicle charger that supplies electric power for driving the electric motor; a connector connecting to an external power supply; and an interconnection connecting the connector to the in-vehicle charger, a plurality of types of the connector and the interconnection being prepared depending on specifications of the external power supply, and corresponding one of the types is selected to configure the connector, the interconnection, and the vehicle body so that the selected external power supply can be mounted to the vehicle body.

A working vehicle according to one aspect is a working vehicle including: a vehicle body; a travel unit; a working unit working by a hydraulic pressure; and an electric motor serving as a drive source for the travel unit or the working unit, the working vehicle including: an in-vehicle charger that supplies electric power for driving the electric motor; and a relay component having an inlet to which an external power cable supplying electric power from an external power supply is coupled, and an intermediate harness for connecting the inlet to the in-vehicle charger, three chargers for a single-phase alternating-current power supply being provided as the in-vehicle charger to configure a parallel circuit, one of the following relay components being selected as the relay component and mounted to the vehicle body: a first relay component for a case where the external power supply is a three-phase alternating-current power supply and the power cable has an output plug of a four-wire type including a ground wire, the first relay component having a first inlet of a four-wire type to which the output plug is removably coupled, and a first intermediate harness that is branched into three from the inlet by at least one of interconnection branching and rearrangement and that is provided with one output terminal outputting a single-phase alternating-current power supply on tip ends of the branches, a second relay component for a case where the external power supply is the three-phase alternating-current power supply and the power cable has an output plug of a five-wire type including the ground wire, the second relay component having a second inlet of a five-wire type to which the output plug is removably coupled, and a second intermediate harness that is branched into three from the inlet by at least one of interconnection branching and rearrangement and that is provided with one output terminal outputting the single-phase alternating-current power supply on tip ends of the branches, and a third relay component for a case where the external power supply is a single-phase alternating-current power supply and the power cable has an output plug of a three-wire type including the ground wire, the third relay component having a third inlet of a three-wire type to which the output plug is removably coupled, and a third intermediate harness that is branched into three from the inlet by at least one of interconnection branching and rearrangement and that is provided with one output terminal outputting the single-phase alternating-current power supply on tip ends of the branches, and the three output terminals of the relay component being electrically connected to input terminals of the three corresponding in-vehicle chargers, respectively.

According to the configurations, it is possible to realize a working vehicle capable of supplying electric power using two types of external power supplies including at least a three-phase alternating-current power supply and three types of power cables by being configured to mount only a charger for a single-phase alternating-current power supply as an in-vehicle charger. At this time, it is unnecessary to provide a device such as a transformer or a phase converter converting the three-phase alternating-current power supply into the single-phase alternating-current power supply in the vehicle and outside the vehicle. This can realize a simplified vehicle structure and cost reduction. Whether the rechargeable battery that supplies the electric power to the electric motor is mounted in the working vehicle, the power supply circuit is configured to operate (perform wired operation) in the state of connecting the power cable to the in-vehicle charger.

It is also preferable that the working vehicle includes a control section exercising control over supply of electric power and a rechargeable battery supplying the electric power for driving the electric motor, and the control section exercises both control to supply the electric power from the in-vehicle charger to the rechargeable battery to charge the rechargeable battery and control to supply the electric power from the in-vehicle charger to the electric motor to drive the electric motor simultaneously or switches between the controls one by one.

It is also preferable that the output terminals of the first relay component, the output terminals of the second relay component, and the output terminals of the third relay component are formed into the same shape.

It is further preferable that for the first relay component, the second relay component, and the third relay component, a fixation portion fixing the first inlet to the vehicle body, a fixation portion fixing the second inlet to the vehicle body, and a fixation portion fixing the third inlet to the vehicle body are formed into the same shape.

Advantageous Effects of Invention

According to the present invention, it is possible to realize a working vehicle capable of supplying electric power using two types of external power supplies including at least a three-phase alternating-current power supply and three types of power cables by being configured to mount only a charger for a single-phase alternating-current power supply as an in-vehicle charger without mounting a device converting the three-phase alternating-current power supply into a single-phase alternating-current power supply.

DESCRIPTION OF EMBODIMENTS

Figure 1:
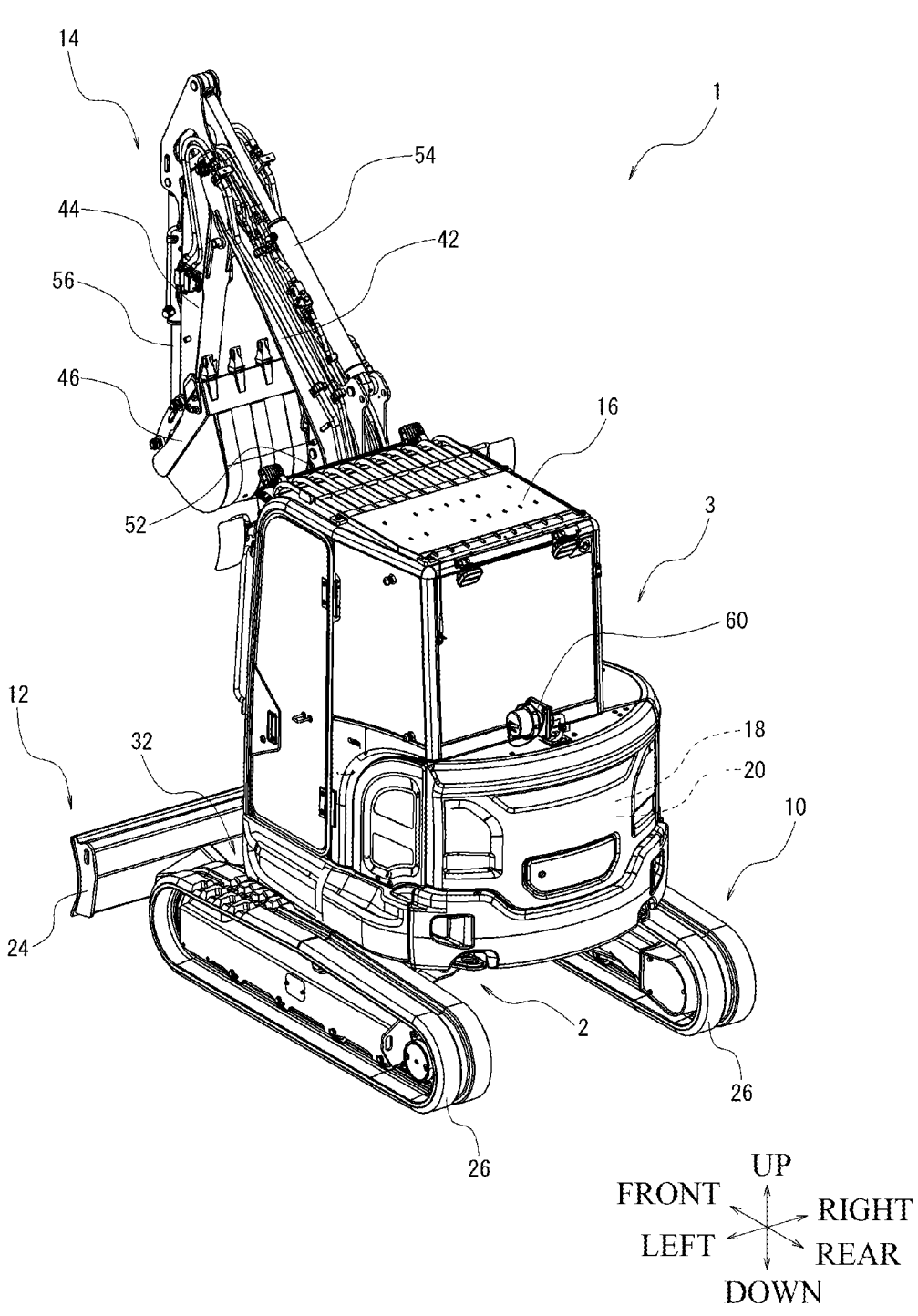
FIG. 1 is a perspective view illustrating an example of a working vehicle according to an embodiment of the present invention.

Embodiments of the present invention will be described hereinafter in detail with reference to the drawings. FIG. 1 is a schematic diagram illustrating an example of a working vehicle 1 according to an embodiment of the present invention (perspective view from above a left rear portion). For the sake of convenience of description, arrows may indicate up and down, front and back, and left and right directions in the drawings. In addition, members having the same function are denoted by the same reference sign and may not be repeatedly described in all the drawings for describing the embodiment.

Overall configurations of the working vehicle 1 will first be described. A hydraulic excavator will be described as an example of the working vehicle 1. However, the working vehicle 1 is not limited to the hydraulic excavator.

As illustrated in FIG. 1, the working vehicle 1 includes a lower body 2 and an upper body 3 provided on the lower body 2 as a vehicle body (the lower body 2 and the upper body 3 may be configured as a one piece).

The working vehicle 1 includes working units 12 and 14 mounted to the lower body 2 or the upper body 3 and working by a hydraulic pressure (hydraulic oil at a predetermined pressure). The lower body 2 includes a travel unit 10 that travels. The upper body 3 includes a cab 16 that is provided in a front portion and in which operating units for an operator getting aboard to operate traveling and work are provided.

The lower body 2 includes a pair of left and right crawlers (endless tracks) 26 as an example of the travel unit 10. However, the travel unit 10 is not limited to the crawlers 26. As another example, the working vehicle 1 may be configured with wheels (not illustrated) instead of the crawlers 26. The crawlers 26 are driven (to travel) by a hydraulic motor for traveling (not illustrated).

As an example of the working unit 12, a blade 24 is provided. The blade 24 is attached to the lower body 2 in such a way as to be able to swing upward and downward (including forward and backward components). The blade 24 is driven by a hydraulic cylinder (blade cylinder) 32. However, the working unit 12 is not limited to the above configuration.

As an example of the working unit 14, a boom 42, an arm 44, and an attachment (in this embodiment, a bucket) 46 are provided. However, the attachment 46 is not limited to the bucket. The boom 42 is attached to the upper body 3 in such a way as to be able to swing upward and downward (including forward and backward components). In this embodiment, a boom bracket (not illustrated) is provided between the upper body 3 and the boom 42. The boom bracket enables the boom 42 to swing to the left and right (including forward and backward components) in relation to the upper body 3. The boom bracket may be omitted. The arm 44 is attached to the boom 42 in such a way as to be able to swing upward and downward (including forward and backward components). The attachment 46 is attached to the arm 44 in such a way as to be able to swing upward and downward (including forward and backward components). The boom 42 is driven by a hydraulic cylinder (boom cylinder) 52. The arm 44 is driven by a hydraulic cylinder (arm cylinder) 54. The attachment 46 is driven by a hydraulic cylinder (bucket cylinder) 56. However, the working unit 14 is not limited to the above configuration.

A driving mechanism for driving the hydraulic motor for traveling and the hydraulic cylinders is configured from, for example, a hydraulic pump 20 driven by a drive source 18, a control valve, and more. The control valve is actuated by operator's operation of the operating units to exercise control to supply a hydraulic oil at a predetermined pressure delivered from the hydraulic pump 20 to the hydraulic motor for traveling and the hydraulic cylinders. This allows for the travel unit 10 to travel and for the working units 12, 14 to work. One or a plurality of hydraulic pumps 20 configuring the driving mechanism are provided depending on configurations, loads, and the like of the working units 12, 14 and the travel unit 10.

In the present embodiment, the working vehicle 1 includes an electric motor as the drive source 18. One or a plurality of electric motors configuring the drive source 18 are provided depending on the number, rated output power, and the like of the hydraulic pump 20. As another example of the drive source 18, the drive source 18 may be configured to use not only at least one electric motor but an engine (not illustrated).

Figure 2:
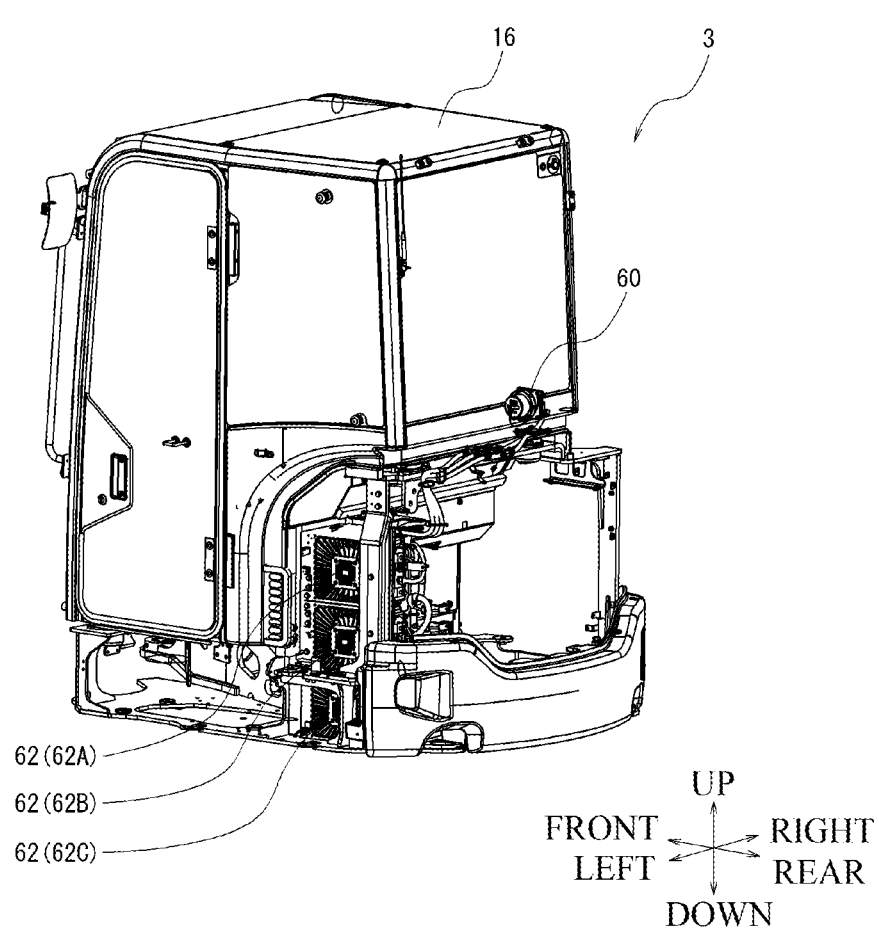
FIG. 2 is a perspective view illustrating a state of mounting an in-vehicle charger in the working vehicle illustrated in FIG. 1.
Figure 3:
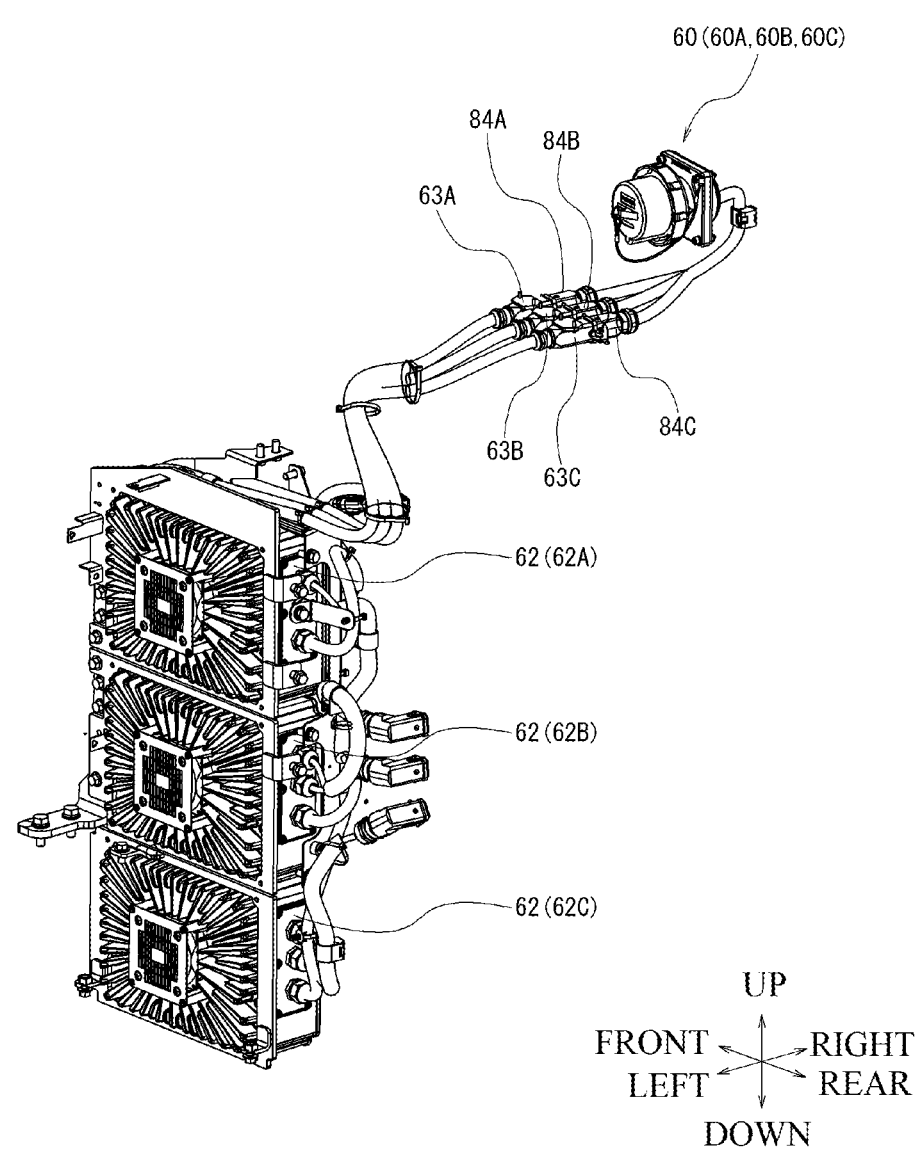
FIG. 3 is a perspective view illustrating an example of a relay component and the in-vehicle charger in the working vehicle illustrated in FIG. 1.

The working vehicle 1 also includes an in-vehicle charger 62 that supplies electric power to the electric motor 18. FIG. 2 is a perspective view illustrating a state of mounting the in-vehicle charger 62 while not illustrating a cover, a rechargeable battery, and the like. FIG. 3 is a perspective view illustrating configurations of the in-vehicle charger 62 and a relay component 60 to be described later.

Figure 4:
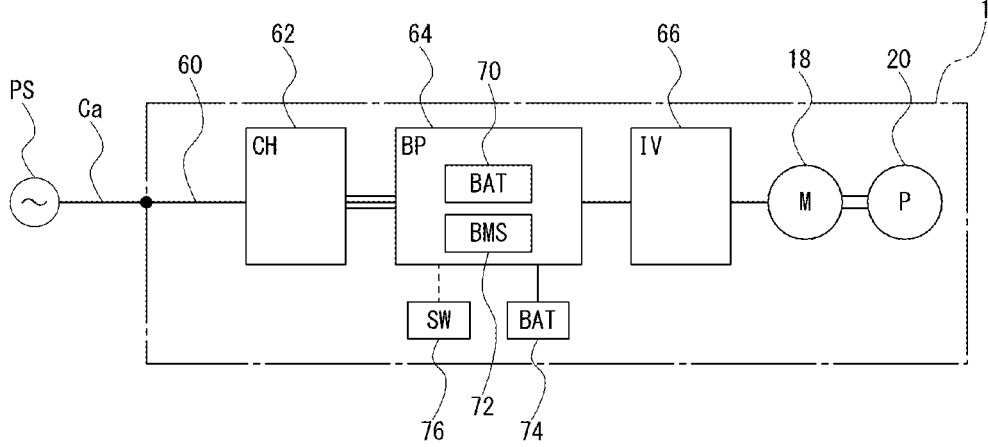
FIG. 4 is a schematic diagram illustrating principal configurations of a power supply circuit in the working vehicle illustrated in FIG. 1.

Next, FIG. 4 illustrates an example of configurations of principal elements configuring a power supply circuit for the working vehicle 1. An external power cable Ca to which electric power is supplied from an external power supply PS is detachably coupled to a relay component 60 provided in the vehicle body (upper body 3 in the present embodiment). Details of configurations of the relay component 60 and configurations for connecting the relay component 60 to the in-vehicle charger 62 will be described later. The electric power output from the in-vehicle charger 62 is supplied to the electric motor 18 via a battery pack 64 and an inverter 66. The battery pack 64 includes a first rechargeable battery (e.g., lithium-ion rechargeable battery) 70 that stores the supplied electric power, a control section 72 controlling supply of the electric power to the electric motor 18 and the rechargeable battery (first rechargeable battery) 70, and the like. A second rechargeable battery (e.g., lead-acid rechargeable battery) 74 and switches (controllers) 76 are connected to the battery pack 64.

The control section 72 exercises both control to supply the electric power from the in-vehicle charger 62 to the rechargeable battery (first rechargeable battery) 70 to charge the rechargeable battery (first rechargeable battery) 70 and control to supply the electric power from the in-vehicle charger 62 to the electric motor 18 to drive the electric motor 18 simultaneously or switches between the controls one by one. That is, with the power cable Ca being connected to the relay component 60, a mode of charging the rechargeable battery (first rechargeable battery) 70 and a mode of driving the electric motor 18 can be executed together or one by one as appropriate.

As another example of the power supply circuit, the power supply circuit can be configured to operate (perform wired operation) in a state of always coupling the external power cable Ca to the relay component 60 without mounting the rechargeable battery (first rechargeable battery) 70 in the battery pack 64.

Other mechanisms for traveling and working in the working vehicle 1 according to the present embodiment are similar to those in a well-known working vehicle (hydraulic excavator) and not described in detail.

Figure 5:
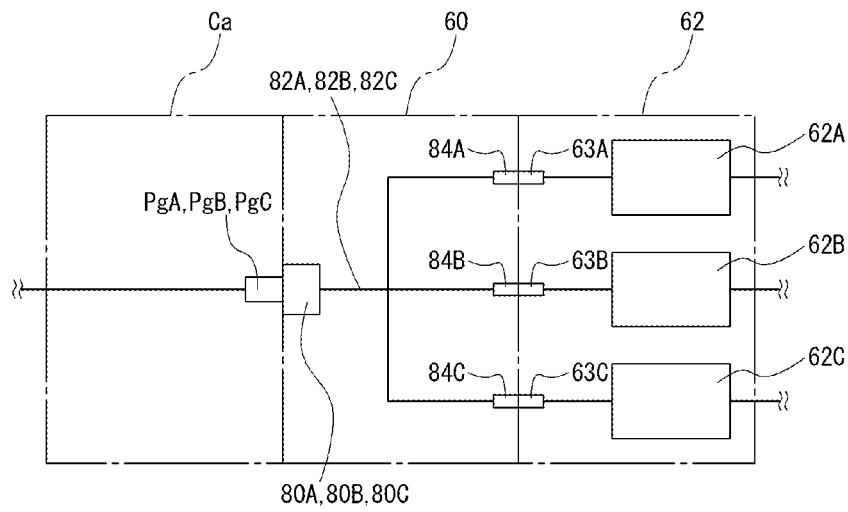
FIG. 5 is a detailed view of part of the schematic diagram illustrated in FIG. 4.

Details of the configurations of the relay component 60 and the configurations of connecting the relay component 60 to the in-vehicle charger 62 will next be described. FIG. 5 is a schematic diagram illustrating an example of configurations of the relay component 60 and the in-vehicle charger 62 in detail.

As the in-vehicle charger 62 according to the present embodiment, three chargers 62A, 62B, and 62C for a single-phase alternating-current power supply are provided to configure a parallel circuit.

Figure 6:
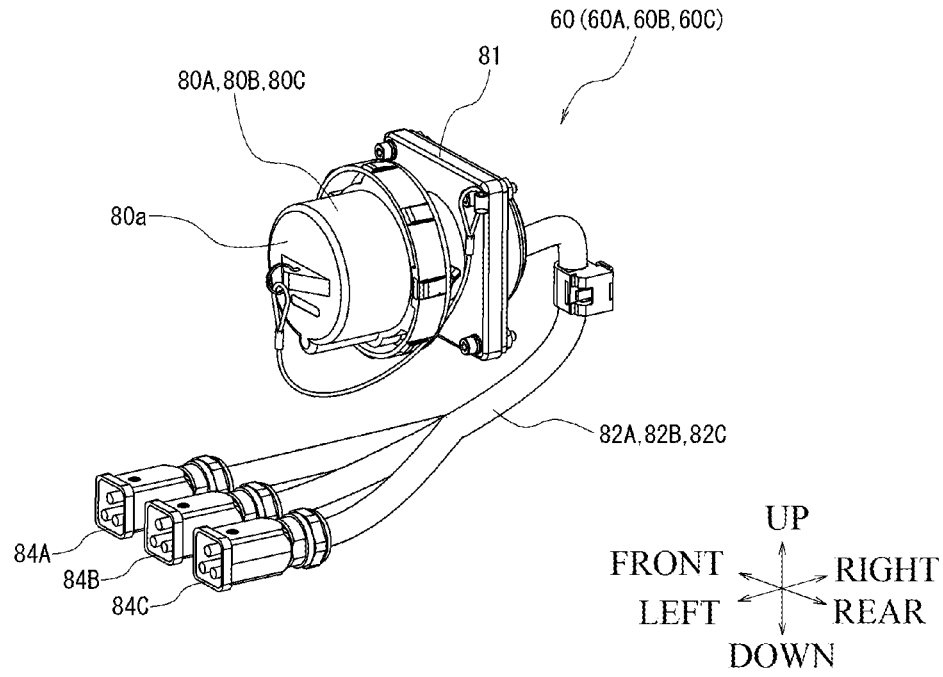
FIG. 6 is a perspective view illustrating an example of the relay component in the working vehicle illustrated in FIG. 1.

As the relay component 60 according to the present embodiment, one of a first relay component 60A, a second relay component 60B, and a third relay component 60C corresponding to the external power supply PS and the power cable Ca is selected and mounted to the vehicle body (upper body 3). FIG. 6 is a perspective view of the relay component 60 with a removable cap 80a fitted into the relay component 60.

Figure 7:
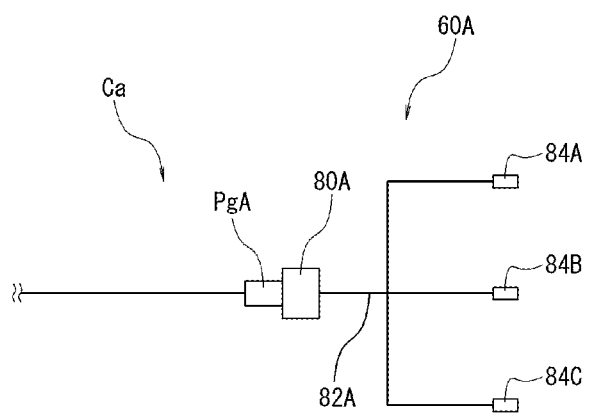
FIG. 7 is a schematic diagram illustrating configurations of a first relay component.

The first relay component 60A is configured to correspond to the case where the external power supply PS is a three-phase alternating-current power supply and the power cable Ca has an output plug PgA of a four-wire type including a ground wire. Specifically, the first relay component 60A is configured with an inlet 80A (often "first inlet" in the present application) of a four-wire type to which the output plug PgA is removably coupled (refer to FIG. 7). The first relay component 60A is configured with an intermediate harness 82A (often "first intermediate harness" in the present application) that is branched into three from the inlet 80A by at least one of interconnection branching and rearrangement and that is provided with output terminals 84A, 84B, and 84C of a three-wire type including a ground wire (or two-wire type excluding the ground wire) outputting a single-phase alternating-current power supply on tip ends of the branches. For example, the output terminals 84A, 84B, and 84C are formed into the same shape.

Figure 8:
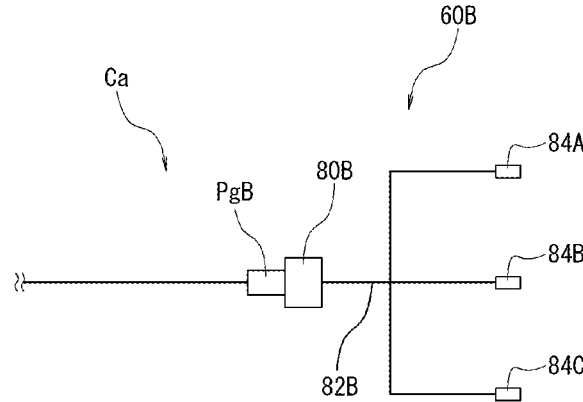
FIG. 8 is a schematic diagram illustrating configurations of a second relay component.

The second relay component 60B is configured to correspond to the case where the external power supply PS is a three-phase alternating-current power supply and the power cable Ca has an output plug PgB of a five-wire type including a ground wire. Specifically, the second relay component 60B is configured with an inlet 80B (often "second inlet" in the present application) of a five-wire type to which the output plug PgB is removably coupled (refer to FIG. 8). The second relay component 60B is configured with an intermediate harness 82B (often "second intermediate harness" in the present application) that is branched into three from the inlet 80B by at least one of interconnection branching and rearrangement and that is provided with output terminals 84A, 84B, and 84C of a three-wire type including a ground wire (or two-wire type excluding the ground wire) outputting a single-phase alternating-current power supply on tip ends of the branches. For example, the output terminals 84A, 84B, and 84C are formed into the same shape.

Figure 9:
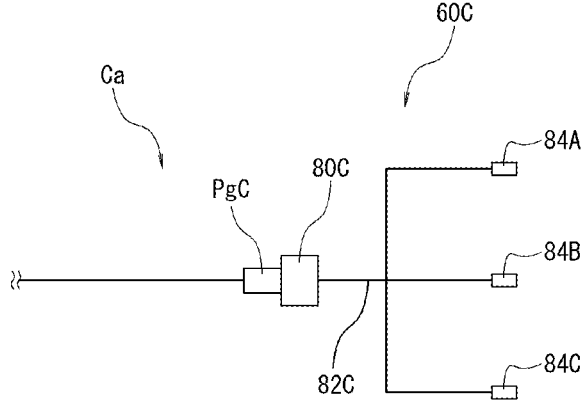
FIG. 9 is a schematic diagram illustrating configurations of a third relay component.

The third relay component 60C is configured to correspond to the case where the external power supply PS is a single-phase alternating-current power supply and the power cable Ca has an output plug PgC of a three-wire type including a ground wire. Specifically, the third relay component 60C is configured with an inlet 80C (often "third inlet" in the present application) of a three-wire type to which the output plug PgC is removably coupled (refer to FIG. 9). The third relay component 60C is configured with an intermediate harness 82C (often "third intermediate harness" in the present application) that is branched into three from the inlet 80C by at least one of interconnection branching and rearrangement and that is provided with output terminals 84A, 84B, and 84C of a three-wire type including a ground wire (or two-wire type excluding the ground wire) outputting a single-phase alternating-current power supply on tip ends of the branches. For example, the output terminals 84A, 84B, and 84C are formed into the same shape.

The relay component 60 is electrically connected to the in-vehicle charger 62. Specifically, whether the relay component 60 is the first relay component 60A, the second relay component 60B, or the third relay component 60C, the output terminals 84A, 84B, and 84C provided on the tip ends of the intermediate harnesses 82A, 82B, and 82C are electrically connected (either directly or via the other interconnection) to input terminals 63A, 63B, and 63C of the corresponding three in-vehicle chargers 62A, 62B, 62C, respectively.

In the present embodiment, the output terminal 84A of the intermediate harness 82A, 82B, or 82C is electrically connected to the input terminal 63A of the in-vehicle charger 62A (the input terminal may be 63B or 63C). The output terminal 84B of the intermediate harness 82A, 82B, or 82C is electrically connected to the input terminal 63B of the in-vehicle charger 62B (the input terminal may be 63C or 63A). The output terminal 84C of the intermediate harness 82A, 82B, or 82C is electrically connected to the input terminal 63C of the in-vehicle charger 62C (the input terminal may be 63A or 63B).

According to the present embodiment, the working vehicle 1 is configured to mount only the chargers for the single-phase alternating-current power supply (three chargers for the single-phase alternating-current power supply 62A, 62B, and 62C in the present embodiment) as the in-vehicle chargers 62. With these configurations, the electric power can be supplied to the working vehicle 1 via the two types of external power supplies PS including at least the three-phase alternating-current power supply and the three types of power cables Ca. At this time, it is unnecessary to provide a device such as a transformer or a phase converter converting the three-phase alternating-current power supply into the single-phase alternating-current power supply in the vehicle and outside the vehicle. This can realize a simplified vehicle structure and cost reduction.

Whether the rechargeable battery (first rechargeable battery 70 described above) that supplies the electric power to the electric motor 18 is mounted in the working vehicle 1, the power supply circuit is configured to operate (perform wired operation) in the state of connecting the power cable Ca to the in-vehicle charger 62.

Furthermore, in the present embodiment, the output terminals 84A, 84B, and 84C of the first relay component 60A, the output terminals 84A, 84B, and 84C of the second relay component 60B, and the output terminals 84A, 84B, and 84C of the third relay component 60C are formed into the same shape.

With these configurations, even when any of the first relay component 60A, the second relay component 60B, and the third relay component 60C is selected to correspond to the output plug (PgA, PgB, or PgC) of the external power cable Ca, the input terminals 63A, 63B, and 63C of the in-vehicle chargers 62 (62A, 62B, and 62C) to which the output terminals 84A, 84B, and 84C are coupled can be commonly used. Therefore, it is unnecessary to prepare a plurality of types of input terminals, thus reducing manufacturing cost.

Furthermore, for the first relay component 60A, the second relay component 60B, and the third relay component 60C in the present embodiment, a fixation portion 81 fixing the inlet (first inlet) 80A to the vehicle body (upper body 3), a fixation portion 81 fixing the inlet (second inlet) 80B to the vehicle body (upper body 3), and a fixation portion 81 fixing the inlet (third inlet) 80C to the vehicle body (upper body 3) are formed into the same shape.

With these configurations, even when any of the first relay component 60A, the second relay component 60B, and the third relay component 60C is selected to correspond to the output plug (PgA, PgB, or PgC) of the external power cable Ca, pedestals (not illustrated) provided on the vehicle body (upper body 3) for fixing the fixation portions 81 can be commonly used. Therefore, it is unnecessary to prepare a plurality of types of pedestals, thus reducing manufacturing cost.

As described so far, according to the present invention, it is possible to realize the working vehicle 1 capable of supplying electric power using two types of external power supplies PS including at least the three-phase alternating-current power supply and three types of power cables Ca by being configured to mount only the chargers (62A, 62B, and 62C) for the single-phase alternating-current power supply as the in-vehicle chargers 62 without mounting the device (such as a transformer or a phase converter) converting the three-phase alternating-current power supply into the single-phase alternating-current power supply.

It is noted that the types of the relay component 60 are not limited to the three types. When the external power supply PS and the power cable Ca have further different specifications, the relay component 60 may be prepared and selected correspondingly.

That is, the present invention can be expressed by the following superordinate concept. Specifically, the working vehicle 1 according to the present invention is a working vehicle including: a vehicle body 2, 3; a travel unit 10; a working unit 12, 14 working by a hydraulic pressure; and an electric motor 18 serving as a drive source for the travel unit 10 or the working unit 12, 14, the working vehicle 1 including: an in-vehicle charger 62 that supplies electric power for driving the electric motor 18; a connector connecting to the external power supply PS; and an interconnection connecting the connector to the in-vehicle charger 62, a plurality of types of the connector and the interconnection being prepared depending on specifications of the external power supply PS, and corresponding one of the types is selected to configure the connector, the interconnection, and the vehicle body (upper body 3) so that the selected external power supply PS can be mounted to the vehicle body (upper body 3). The connector is, for example, the inlets 80A, 80B, and 80C or the inlets 80A, 80B, and 80C and cables (e.g., the power cables Ca or relay cables) connected to the inlets 80A, 80B, and 80C according to the embodiment. Furthermore, the interconnection is, for example, the intermediate harnesses 82A, 82B, and 82C or the intermediate harnesses 82A, 82B, and 82C and cables (e.g., relay cables) connected to the intermediate harnesses 82A, 82B, and 82C.

The present invention is not limited to the above example (hydraulic excavator). The present invention is similarly applicable to other working vehicles (e.g., a track loader and a tracked dumper).

What is claimed is:

1. A working vehicle comprising:
a vehicle body;
a travel unit;
a working unit working by a hydraulic pressure; and
an electric motor serving as a drive source for the travel unit or the working unit, wherein
the working vehicle comprises:
an in-vehicle charger that supplies electric power for driving the electric motor;
an inlet to which an external power cable supplying electric power from an external power supply is coupled as a connector connected to the external power supply;
an intermediate harness for connecting the inlet to the in-vehicle charger as an interconnection connecting the connector to the in-vehicle charger; and
a relay component having the inlet and the intermediate harness, and wherein
a plurality of types of the relay component are prepared depending on specifications of the external power supply, and the inlet, the intermediate harness, and the vehicle body are configured so that one corresponding type of the relay component is selected from the plurality of types and can be mounted to the vehicle body.

2. A working vehicle comprising:
a vehicle body;
a travel unit;
a working unit working by a hydraulic pressure; and
an electric motor serving as a drive source for the travel unit or the working unit, wherein the working vehicle comprises:
an in-vehicle charger that supplies electric power for driving the electric motor; and
a relay component having an inlet to which an external power cable supplying electric power from an external power supply is coupled, and an intermediate harness for connecting the inlet to the in-vehicle charger, wherein
three chargers for a single-phase alternating-current power supply are provided as the in-vehicle charger to configure a parallel circuit,
one of the following relay components is selected as the relay component and mounted to the vehicle body:
a first relay component for a case where the external power supply is a three-phase alternating-current power supply and the power cable has an output plug of a four-wire type including a ground wire, the first relay component having a first inlet of a four-wire type to which the output plug is removably coupled, and a first intermediate harness that is branched into three from the inlet by at least one of interconnection branching and rearrangement and that is provided with one output terminal outputting a single-phase alternating-current power supply on tip ends of the branches,
a second relay component for a case where the external power supply is the three-phase alternating-current power supply and the power cable has an output plug of a five-wire type including the ground wire, the second relay component having a second inlet of a five-wire type to which the output plug is removably coupled, and a second intermediate harness that is branched into three from the inlet by at least one of interconnection branching and rearrangement and that is provided with one output terminal outputting the single-phase alternating-current power supply on tip ends of the branches, and
a third relay component for a case where the external power supply is a single-phase alternating-current power supply and the power cable has an output plug of a three-wire type including the ground wire, the third relay component having a third inlet of a three-wire type to which the output plug is removably coupled, and a third intermediate harness that is branched into three from the inlet by at least one of interconnection branching and rearrangement and that is provided with one output terminal outputting the single-phase alternating-current power supply on tip ends of the branches, and wherein
the three output terminals of the relay component are electrically connected to input terminals of the three corresponding in-vehicle chargers, respectively.

3. The working vehicle according to claim 2, comprising:
a control section exercising control over supply of electric power; and
a rechargeable battery supplying the electric power for driving the electric motor, wherein
the control section exercises both control to supply the electric power from the in-vehicle charger to the rechargeable battery to charge the rechargeable battery and control to supply the electric power from the in-vehicle charger to the electric motor to drive the electric motor simultaneously or switches between the controls one by one.

4. The working vehicle according to claim 3, wherein
the output terminals of the first relay component, the output terminals of the second relay component, and the output terminals of the third relay component are formed into the same shape.

5. The working vehicle according to claim 3, wherein for the first relay component, the second relay component, and the third relay component, a fixation portion fixing the first inlet to the vehicle body, a fixation portion fixing the second inlet to the vehicle body, and a fixation portion fixing the third inlet to the vehicle body are formed into the same shape.

6. The working vehicle according to claim 2, wherein the output terminals of the first relay component, the output terminals of the second relay component, and the output terminals of the third relay component are formed into the same shape.

7. The working vehicle according to claim 2, wherein for the first relay component, the second relay component, and the third relay component, a fixation portion fixing the first inlet to the vehicle body, a fixation portion fixing the second inlet to the vehicle body, and a fixation portion fixing the third inlet to the vehicle body are formed into the same shape.

* * * * *